Aug. 7, 1951     N. C. PRICE     2,563,270
GAS REACTION POWER PLANT WITH A VARIABLE AREA NOZZLE
Original Filed Feb. 14, 1944     2 Sheets-Sheet 1
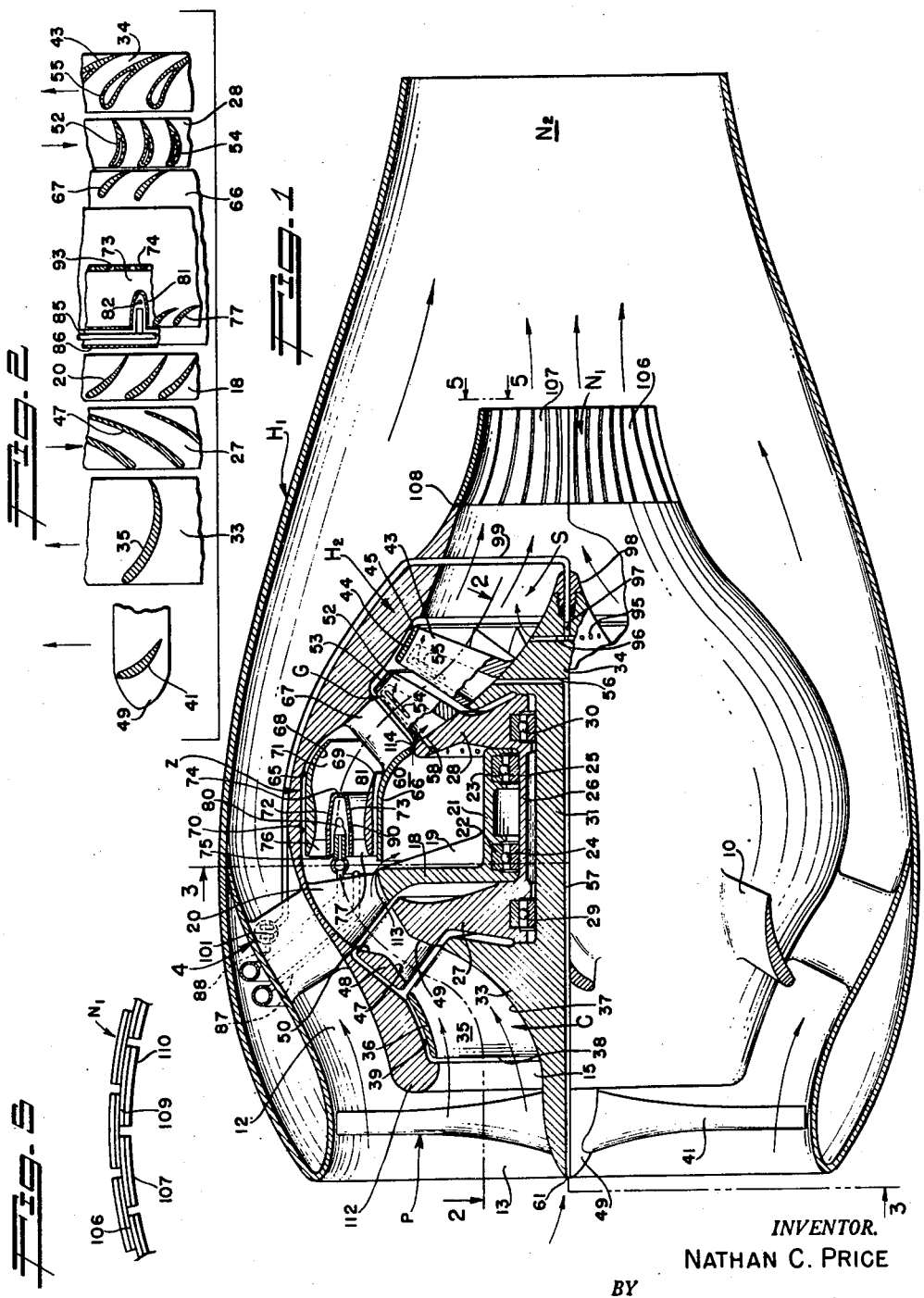
INVENTOR.
NATHAN C. PRICE
BY
George C. Sullivan
Agent

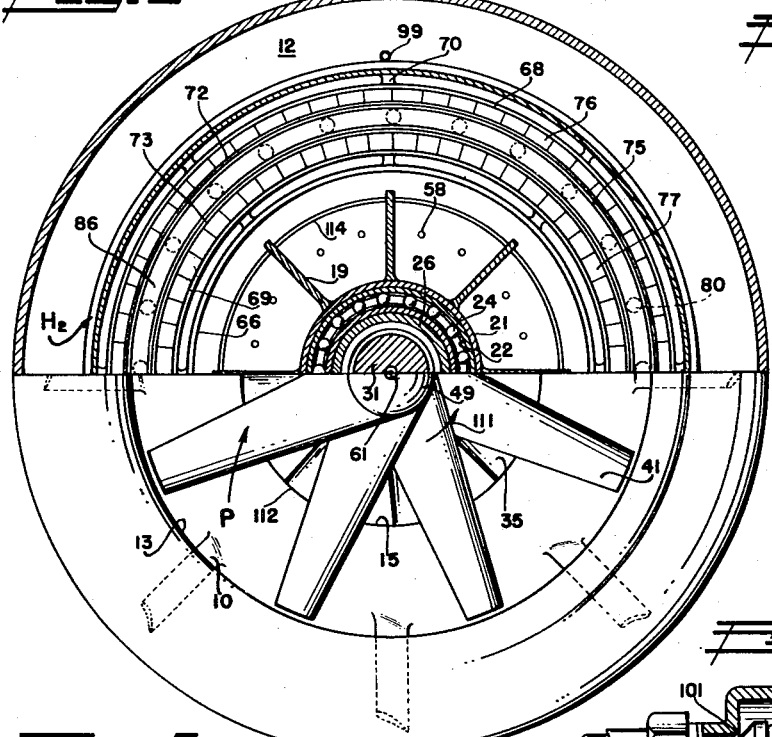
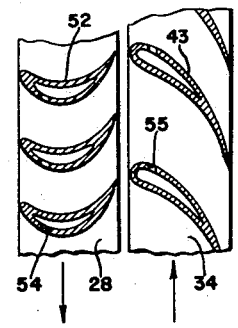
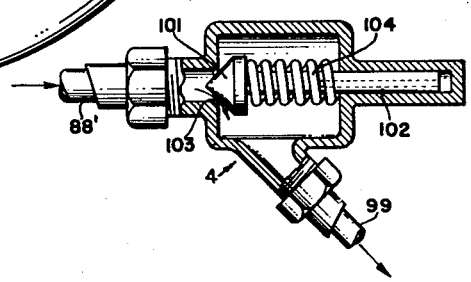
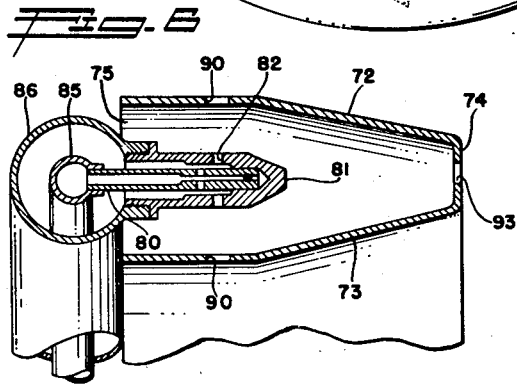
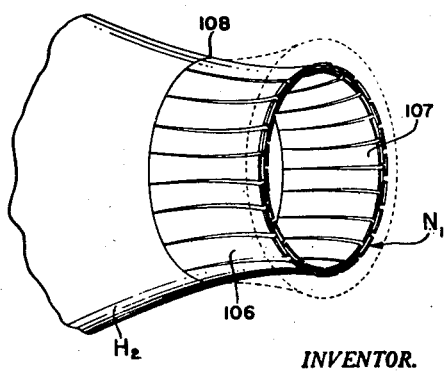

Patented Aug. 7, 1951

2,563,270

UNITED STATES PATENT OFFICE 2,563,270

GAS REACTION POWER PLANT WITH A VARIABLE AREA NOZZLE

Nathan C. Price, Hollywood, Calif., assignor to Lockheed Aircraft Corporation, Burbank, Calif.

Original application February 14, 1944, Serial No. 522,343. Divided and this application June 29, 1945, Serial No. 602,289

13 Claims. (Cl. 60—35.6)

This invention relates to prime movers, and relates more particularly to internal combustion reaction type power plants. The present application is a division of application Serial No. 522,343 filed February 14, 1944.

The power plant of the invention has many adaptations, but finds its principal application in the propulsion of aircraft and other high speed vehicles, and particularly airplanes of medium weight and medium high speed. In application Serial No. 522,343, I have disclosed a jet reaction type power plant adapted for the propulsion of medium high speed and medium speed aircraft designed to induct and accelerate a relatively large mass flow of air to a medium velocity and to eject this large mass flow at reduced or medium velocities to minimize residual wake turbulence losses. This is accomplished in a power plant of compact construction having a high ratio of power output per unit of weight of the plant.

In a medium speed power unit of this character it is desirable to provide for a substantial range of operational speeds and to provide for increased thrust during take-off and when sudden bursts of power are required. To obtain this versatility in the matter of speed, I have provided a supplemental fuel injection means for introducing additional fuel into the exhaust stream of the turbine. The combustion of the supplemental fuel increases both the temperature and the volume of the gas before it is spouted from the primary nozzle, and unless the increase in gas volume is compensated for, the back pressure on the turbine is increased with the result that the rotative speed is decreased.

It is an object of this invention to provide a power plant of the class above referred to embodying a main or primary fuel injecting means between the compressor and the turbine, a secondary or supplemental fuel injecting means between the turbine and the nozzle, and an automatically operable variable area nozzle which compensates for the increase in gas volume accompanying the induction of the supplemental fuel. The automatic action of the nozzle in increasing the flow area when supplemental fuel is employed prevents the increase in gas volume, accompanying the injection of supplemental fuel, from imposing increased back pressure on the turbine and from interfering with the proper expansion of the gas in the turbine. While the nozzle of the invention is especially useful in compensating for an increase in the volume of the gas flow, it operates in a like manner to compensate for variations in the gas flow volume accompanying changes in operating conditions where only a single primary fuel injecting means is in operation or is embodied in the power plant.

It is another object of the invention to provide a variable area nozzle for an internal combustion reaction type power plant that is automatically responsive to both the temperature and the pressure of the gas ejected to vary the area of the nozzle opening. The variable area nozzle is fully automatic and does not require either manual control means or operating devices such as servo mechanisms, cylinder and piston devices, or the like. The device is self-contained and energized by the temperature and pressure conditions.

Another object of the invention is to provide a power plant construction of the character referred to in which the nozzle may be designed to define a convergent nozzle passage for the sonic and sub-sonic velocity flow of gas under low and medium speed operating conditions of the power plant, and which automatically assumes a form to define a convergent-divergent nozzle passage for the super-sonic flow of gas under higher speed operating conditions. The nozzle means automatically assumes a configuration best adapted to the prevailing gas flow conditions and imposed operating requirements of the power plant.

A still further object of the invention is to provide a nozzle means for a reaction type power plant which offers a minimum of resistance and friction to the flow of the discharging gas. The nozzle may have a smooth continuous and regular connection with the casing which conducts the gas from the turbine and is entirely devoid of internal projections and flow control, and directing elements offering resistance to gas flow.

Yet another object of the invention is to provide a nozzle means of the class above mentioned embodying a multiplicity of bi-metal segments or leaves constructed and arranged to define the flow area of the nozzle, and operable in response to increased temperature and increased pressure to bend outwardly and thus increase the diameter of the nozzle and change its configuration, and which are adapted to return to their original positions and thus restore the nozzle passage to its former area and shape upon the resumption of normal or previous operating conditions. The bi-metal leaves arranged in slidable overlapping relation define an imperforate nozzle tube which is readily expansible and contractable under the influence of variations in temperature and exhaust gas pressure conditions.

Other objects and features of the invention will be readily understood from the following detailed description of a typical preferred form of the invention wherein reference will be made to the accompanying drawings in which:

Figure 1 is a longitudinal sectional view of the power plant embodying this invention with a portion of the inner assembly appearing in side elevation;

Figure 2 is a diagrammatic longitudinal fragmentary sectional view of the blading in the power plant taken substantially as indicated by line 2—2 on Figure 1;

Figure 3 is a view taken as indicated by line 3—3 on Figure 1 showing a portion of the power plant in vertical cross section and a portion in front elevation;

Figure 4 is an enlarged sectional view of a valve embodied in the fuel injecting system;

Figure 5 is an enlarged fragmentary end view of the nozzle structure taken as indicated by line 5—5 on Figure 1;

Figure 6 is an enlarged longitudinal sectional view of the fuel injecting means;

Figure 7 is an enlarged cross section of certain turbine blading; and,

Figure 8 is a perspective view of the nozzle of the invention.

The power plant assembly comprises the following main components: an outer housing $H_1$, an inner housing $H_2$ within the outer housing, a mixed axial and radial flow turbo compressor C in the inner housing, a counter rotational mixed axial and radial flow gas turbine G in the inner housing, an annular combustion chamber Z between the compressor and turbine, a secondary combustion zone S in the inner housing, a primary discharge nozzle $N_1$, a secondary propulsion nozzle $N_2$ on the outer housing, and an induction propeller P.

The inner housing $H_2$ is concentrically supported in the outer housing $H_1$ by a plurality of streamlined struts or vanes 10 and the housings are spaced and related to define an annular passageway 12 of convergent-divergent cross-sectional area. The streamlined outer housing $H_1$ has a forward inlet opening 13 and a contracted rearward portion or nozzle $N_2$. The inner streamlined housing $H_2$ has a forwardly directed inlet 15 and carries at its rear end the discharge nozzle $N_1$ of the present invention. The nozzle $N_1$ is arranged coaxially within and adjacent the outlet or nozzle $N_2$ of the outer housing. The nozzle $N_1$ functions as the primary discharge nozzle, and the nozzle $N_2$ serves as the augmenter.

A structure is provided in the inner housing $H_2$ to rotatably support the interconnecting drive shafts of the compressor and turbine. This structure includes a longitudinal disc or diaphragm member 18 having radially stiffening webs 19. The diaphragm 18 is supported at its periphery by radial vanes 20 which form the static discharge diffusion nozzle ring of the compressor C. The vanes 20 have their outer ends attached to the inner housing wall adjacent the inner ends of the supporting vanes 10. The diaphragm 18 is thus supported from the outer housing by the supporting vanes 10 and the nozzle vanes 20. The central portion of the diaphragm 18 and webs 19 carry a tubular bearing supporting shaft housing 21 having longitudinally spaced annular recesses 22 and 23 carrying bearings 24 and 25.

A tubular shaft 26 for connecting a compressor rotor 27 and a turbine rotor 28 is supported by the bearings 24 and 25 to be concentrically positioned within the shaft housing 21. A second pair of bearings 29 and 30 is provided at the forward and rearward ends of the shaft 26 to carry a centrally positioned shaft 31 which interconnects the compressor rotor 33 and the turbine rotor 34. The first stage compressor rotor 33 and the final stage turbine rotor 34 are thus connected by the central shaft 31, which is rotatably journaled in the tubular shaft 26 by the bearings 29 and 30, and the shaft 26 connecting the second stage compressor rotor 27 with the first stage turbine rotor 28 is supported for independent rotation by the bearings 24 and 25 within the housing 21.

The first stage compressor rotor 33, on the forward end of the central shaft 31, is approximately conical and carries radially extending airfoil shaped impeller vanes 35. A curved shroud 36 is provided at the tips of the vanes. The inner opposite curved surfaces 37 of the rotor 33 and the shroud 36 are shaped to define a forwardly directed axial inlet opening 38 registering with the inlet opening 15 leading to the blades 35. This forms a mixed axial and radial flow passage therebetween discharging into the counter rotating stage. The shroud 36 rotates with the blades 35 within an annular recess 39 in the internal surface of the inner housing $H_2$. A hub 40 is provided on the forward extension of the shaft 31 and carries radially extending airfoil sectioned impeller blades 41 which form the induction propeller P. A conical shaped turbine rotor 34 is located on the rear end of the central shaft 31, and is provided with radial airfoil shaped turbine impeller blades 43 terminating in a shroud member 44. The member 44 rotates in an annular recess 45 in the inner surface of the housing $H_2$.

The second stage compressor rotor 27 carries on its outer periphery, a plurality of curved impeller vanes 47 which extend radially intermediate the rotor 27 and a shroud member 48. The member 48 rotates in an extension of the recess 39 adjacent the shroud 36. The outer surface 49 of the rotor 27 and the inner surface 50 of the shroud 48 form a fluid passage having a convergent inlet and a divergent outlet providing a throat section resembling a venturi as seen in longitudinal cross section as in Figure 1. This Venturi shaped passage containing the impeller or diffuser blades 47 set at low angles of incidence, constitutes a counter rotating supersonic diffuser.

The first stage turbine rotor 28 is located on the rear portion of the shaft 26 and carries airfoil shaped impeller blades 52. The blades 52 terminate at their tips in an annular shroud member 53 which rotates within the recess 45.

The first and second stage impeller blades 52 and 43 are hollow and have slots 54 and 55 open at the convex or anti-lift surfaces adjacent the tips and leading edges of the blades. The slots may, in general, be similar to those described in my copending application, Serial No. 488,029, now Patent No. 2,468,461, issued Apr. 26, 1949. Radial cooling air passages 56 are provided in the rotor 34 to connect the interiors of the hollow blades 43 with a passage 57 extending axially through the central shaft 31. The passage 57 leads to an inlet opening 61 in the tip of the hub 49. Similar passages 58 are provided in the peripheral portion of the rotor 28 and lead into the interiors of the first stage impeller blades 52. The passages 58 connect with the cavity 60 adjacent the supporting diaphragm 18.

The annular combustion chamber Z is formed between the inner surface 65 of an intermediate section of the housing H₂ and an inner annular wall member 66. The chamber Z interconnects the compressor and turbine. The wall member 66 has an inwardly curved rear end supported by curved vanes 67 which form the turbine inlet nozzle. The nozzle vanes 67 have an entrance angle parallel to the swirl angle of the combustion chamber gases so as to receive the gases without shock, and the vanes terminate at an exit angle of about 13° from the tangent. A small radial slot 113 is formed between the partition 66 and the diaphragm 18 to connect the entrance of the combustion chamber with the cavity 60 for the passage of the cooling air into the cavity. Annular shroud members 68 and 69 of heat resistant material are positioned within the chamber Z. The members 68 and 69 are spaced from the walls 65 and 66 respectively to leave annular air passages and to enclose a combustion zone 71. The combustion chamber Z is thus an approximately annular space curved inwardly and diminishing in diameter toward its outlet end, defined at the outside by the surface 65 of the intermediate portion of the housing H₂ and at the inside by the concentric wall 66. The slightly converging rear portion of the chamber Z forms an outlet passage of reduced area containing the nozzle ring structure embodying the circumferentially spaced vanes 67.

The shroud members 68 and 69 are supported from the outer surface 65 of the chamber Z by circumferentially spaced struts 70 shown in Figure 3. Within the forward portion of the combustion zone, centrally located between the members 68 and 69, is a short annular member having two converging walls 72 and 73 joining in an apex 74 and opening forwardly at 75 to form a spray nozzle housing. Series of swirl vanes 76 and 77 support the walls 72 and 73 on the shrouds 68 and 69. The swirl vanes have an exit angle of about 25° to the tangent. Two vaned annular inlet passages are thus formed at the entrance of the combustion zone at the sides of the nozzle housing 72—73 between the shrouds 68 and 69 to impart spiral flow to fluid flowing through the combustion chamber.

A plurality of fuel spray jets 80 extend into the forward portion of the nozzle housing defined by the walls 72 and 73, and each jet carries a spray head 81 provided with lateral orifices 82. Pipe nipples connected with circular pipe manifolds 85 and 86 support the spray heads and supply them with a mixture of liquid fuel and injection air. The external manifold 86 is supplied with air under pressure by a pipe 87, and the internal manifold 85 is supplied with liquid fuel under pressure by a pipe 88. The supply pipes 87 and 88 may enter the inner housing from suitable sources of supply through one or more of the supporting struts 10.

The converging walls 72 and 73 of the nozzle housing have apertures 90 registering with the jet head orifices 82 so that the atomized mixture of fuel and air may be projected laterally into the adjacent contracted portions of the Venturi shaped air passages which lead into the combustion zone 71. A plurality of perforations 93 is provided in the apex 74 of the nozzle housing for the flow of cooling air through the housing.

A plurality of apertures 95 is provided in the turbine rotor 34 for the introduction of supplementary fuel into the turbine exhaust passage. The orifices 95 are supplied with fuel by lateral ducts 96 extending radially from a central bore 97 in the tail portion of the rotor 34. The bore 97 connects with a fuel supply pipe 99 through a stuffing box 98. The fuel supply pipe 99 is connected with a branch fitting on the main fuel line 88 through a spring loaded valve indicated at 4 in Figure 1 and shown in detail in Figure 4. The valve includes a conical valve member 101 slidably supported on a stem 102 and urged to the closed position against a beveled seat 103 by a spring 104. The spring normally holds the valve closed against the fluid pressure in pipe 88'. When the pressure in the pipes 88 and 88' exceeds a given maximum, the pressure acting on the valve 101 opens the valve against the spring 104 so that fuel passes through the pipe 99 to the supplemental fuel spray orifices 95.

The nozzle N₁ at the rear extremity of the housing H₂ is an important element of the invention. The nozzle is operable to automatically change configuration and effective gas flow area in response to certain conditions accompanying power plant operation to maintain optimum performance of the unit. More specifically, the throat area and the effective shape of the nozzle N₁, change in response to variations in temperature and pressure of the turbine exhaust gases to automatically compensate for such variations. The nozzle is characterized by its simplicity, low production cost and its automatic action.

The nozzle N₁ is a tubular unit or assembly arranged on the rear extremity of the inner housing H₂ to form a continuous extension thereof. As best shown in Figure 1, the rear portion of the tubular housing H₂ is convergent and the thickness of its wall gradually diminishes in the rearward direction. It will be observed that the inner surface of the housing H₂ is smooth and that there are no flow obstructing projections or objects within the rear portion of the housing. The nozzle N₁ constitutes a continuation of this unobstructed passageway. In accordance with the invention, the nozzle is made up of temperature and pressure responsive elements in the form of relatively narrow elongate strips or leaves. As illustrated in Figures 1 and 5, there are pluralities of these leaves 106 and 107 arranged in concentric rows or series to comprise a tubular assembly. The leaves of each row are preferably alike, and in practice, the several leaves 106 and 107 may be substantially identical. The adjacent leaves of each annular series are spaced apart to leave narrow gaps or spaces and thus assure independent thermal expansion and flexure of the leaves. The leaves 106 and 107 are in overlapping relation; that is, the leaves in one annular series are offset circumferentially with respect to the leaves in the other series so that the narrow gaps between the leaves of each series are closed against the lateral passage or escape of gas. The overlapping leaves 106 and 107 are in forcible contact with one another to prevent vibration, and to prevent gas leakage, but have sliding engagement to permit free independent relative movement. As best illustrated in Figure 5, the leaves are arcuate or transversely curved so as to define a nozzle tube of substantially circular cross section and so as to have free relative sliding movement.

The leaves 106 and 107 of the nozzle N₁ are each made up of superimposed laminations of materials having different coefficients of expansion. In the construction illustrated, each leaf comprises two superimposed laminations 109 and 110 joined in face-to-face relation. The laminations 109 and 110 may be constructed of various selected dissimilar materials having widely different coefficients of expansion. In a typical case, the laminations 110 may be constructed of steel alloy containing 18 per cent chromium and 8 per cent nickel to have a high coefficient of expansion, and the laminations 109 may be constructed of a steel alloy containing 25 per cent chromium and 12 per cent nickel, to have a relatively low expansion. In such a case the alloy in the laminations 110 has a coefficient of thermal expansion approximately twice that of the alloy in the laminations 109.

The pressure and temperature sensitive nozzle $N_1$, changes not only in its effective nozzle area, but also in its configuration in response to temperature and pressure variations. The forward ends of the leaves 106 and 107 are anchored to the rear end of the housing $H_2$ at 108 by rivets, welding, or other appropriate means to continue rearwardly from the housing. With the leaves 106 and 107 thus anchored at their forward ends they are free for radial flexure and for circumferential expansion produced by variations in the temperature and pressure of the gas passing through the nozzle. As above described, the rear wall portion of the housing $H_2$ is rearwardly convergent, and the nozzle-forming leaves 106 and 107 continue in this rearward convergent relation to constitute a smooth extension of the housing wall. However, the leaves of the nozzle are longitudinally curved to have reduced convergence as they extend rearwardly so that their rear portions approach the true axial, assuming the nozzle to be cool or subject to reduced temperatures and pressures. With this formation of the leaves 106 and 107, the nozzle has a throat configuration which is more pronounced when the leaves bow outwardly in response to increased temperature or pressure, or both. This throat area of the nozzle occurs between the ends of the nozzle opening so that the bimetal leaves are subjected to gas temperature and flow conditions to a pronounced extent in this area to more readily respond to thermal and pressure variations. The construction is such that the leaves 106 and 107 are sufficiently resistant to both temperature and pressure to retain the convergent nozzle configuration so long as the power plant generates only sonic or sub-sonic exhaust flow. However, when super-sonic gas flow is reached and exceeded, the temperature and pressure increases cause the leaves to assume positions where they define a convergent-divergent nozzle passage for the more effective spouting of a super-sonic propulsive jet. The broken lines in Figure 8 illustrate the configuration of the nozzle $N_1$ when expanded for super-sonic gas flow. The change in shape under the influence of increased temperature and pressure is accompanied by an increase in the area or capacity of the nozzle throat so that the capacity as well as the configuration of the nozzle alter in accordance with variations in power plant operating conditions. Upon a reduction in temperature and pressure, the leaves 106 and 107 return to their initial positions or flex inwardly to reduce the area of the nozzle opening and to restore the nozzle to the convergent configuration.

The operation is as follows:

The propeller P which may be 18 inches in diameter, in a representative case, and the initial stage compressor rotor 33 and vanes 35 are driven during rated power operation at approximately 10,500 R. P. M.; for example, in a counter clockwise direction as indicated by arrow 111 as viewed from the forward end in Figure 3. The propeller P and rotor 33 are driven through the central shaft 31 by the last stage of the gas turbine which comprises the rotor 34 and impeller blades 43. The propeller thus operated is capable of inducting approximately 45 pounds of air per second at sea level with a pressure rise ratio exceeding approximately 1.12 to 1.0. The second stage of the compressor comprising the rotor 27 and the impeller diffuser vanes 47 is ordinarily driven at approximately 22,000 R. P. M.; for example, in a clockwise direction, counter to that of the beforementioned first compressor stage. The second stage of the compressor is driven by the first stage of the gas turbine comprising the rotor 28 and impeller blades 52 through the medium of the tubular shaft 26. The specified rotative speeds will vary to some extent, depending on conditions imposed upon the power plant, as will be later described. In operation in an aircraft moving at high velocity, rammed air enters the forward opening 13 of the unit under pressure, or if the unit is moving at lower velocities or is stationary, air is drawn into the forward opening 13 by means of the propeller P where the stream is initially divided by the leading edge 112 of the inner housing $H_2$. A portion of the air flows outside of the inner housing through the annular space 12 formed between the inner and outer housings $H_1$ and $H_2$ and thence rearwardly to be finally discharged from the outlet $N_2$ together with comingled combustion gases, as hereinafter more fully described. The other portion of the divided air entering the forward end of the unit passes into the opening 15 and the first stage 35 of the compressor C. Air discharged from the first stage 35 of the compressor passes into the counter-rotating converging-diverging diffuser rotor section 47, and thence through the stationary or static diffuser vanes 20 into the forward entrance end of the combustion chamber Z at a pressure of approximately 105 pounds per square inch absolute, at sea level.

Under normal operation the convergent domain of the diffuser receives air at super-sonic velocity relative thereto of approximately 1800 feet per second, for example, such air being compressed by the reduction of the free passage area in the direction of flow. The air reaching the diffuser throat is raised in pressure by the preceding convergent domain, to such an extent that the relative velocity of the air leaving it has been lowered to the velocity of sound. Thus beyond the diffuser throat, in the divergent portion, further diffusion and consequent increase of air pressure proceeds at sub-sonic relative velocity.

The air thus compressed is discharged into the combustion chamber and is again divided several ways, a major portion flowing through the two concentric annular inlet passageways containing the swirl vanes 76 and 77 formed between the shrouds 68 and 69 and located on either side of the fuel spray nozzle housing 72—73, thence through the Venturi shaped passageway into the combustion zone shrouds 68 and 69 and the combustion zone walls 65 and 66 for cooling. Still another minor portion of the air passes around the manifold piping 86 and through the converging passageway formed within the spray nozzle housing 72—73, and thence through perforations 93 into the combustion zone 70. A small quantity of air escapes inwardly through the slot 113 into the inner cavity 60 for cooling of the internal structure and the turbine rotor and blades as hereinafter described. Liquid fuel such as kerosene, or the like, introduced into pipe 88 under pressure from a suitable source (not shown) issues from the orifices 82, together with atomizing air introduced into pipe 87 under pressure, and passes laterally out through apertures 90 in the form of a spray into the beforementioned Venturi shaped air passages where it meets and mixes with the flowing air stream. The resulting fuel-air mixture passes onward into the combustion zone 70 where combustion takes place. Combustion may be initiated by a spark plug or glow plug in the manner described in my aforesaid Patent No. 2,468,461. The swirl vanes 76 and 77 at the entrance to the Venturi shaped air passages leading to the combustion zone 71 impart a spiral flow pattern to the burning atomized fuel-air mixture flowing through the annular space of the combustion zone. The turbulence of the spiral flow effects a more thorough mixing of the fuel and combustion air. The spiral flow compacts the flame in the axial direction, thus reducing to a minimum the length of the combustion chamber. This permits, in effect, a shorter length of combustion chamber for a given degree of mixing and heat generating capacity than would otherwise be possible.

The resultant heated products of combustion and excess air at the combustion zone pressure of about 105 pounds per square inch absolute, are discharged through the outlet nozzle formed between the nozzle vanes 67 and pass into the expansion zone of the gas turbine where counter-rotative impulsion is given to the two rows of impeller blades 52 and 43. The partially expanded gases exhausted from the gas turbine are finally discharged in the form of a jet through the variable opening nozzle $N_1$ where they comingle with and give impulse to the beforementioned air flowing rearwardly through the annular passageway 12 between the inner and outer housings. The comingled discharged gases and air are finally discharged rearwardly through the outlet nozzle $N_2$ in the form of a reactive jet. When added thrust or increased power is desired, an increase in the fuel pressure in the supply pipe 88 above a predetermined value results in the opening of the spring loaded valve 101 to allow fuel to flow through pipe 99, stuffing-box 98 and thence through lateral ducts 96 in the turbine rotor 34 leading to the orifices 95. The orifices 95 spray the fuel into the gases exhausted from the gas turbine and flowing through the secondary combustion zone S. Combustion of the supplementary fuel thus sprayed into the discharged gases containing excess unconsumed oxygen, results in augmented velocity and increased temperature of gases passing out through the nozzle $N_1$. The resultant increase in the temperature and pressure of the gases passing through the nozzle $N_1$ causes the bimetal leaves 106 and 107 to bend outwardly by the combined pressure and differential thermal expansion effect. This outward bending of the leaves increases the diameter and area of the nozzle opening and alters the configuration of the nozzle. When super-sonic gas velocities are reached, the leaves 106 and 107 flex to such an extent as to convert the normally convergent nozzle into a convergent-divergent nozzle for the most effective spouting of the super-sonic flow. The increase in nozzle area and the alteration in the configuration of the nozzle automatically accommodate the increased gas volume and avoids augmented back pressure on the turbine which might produce a reduction in rotative speed and diminishing the effective power plant thrust.

As before mentioned, a portion of the compressed air discharged from the compressor C into the entrance of the combustion chamber Z escapes through an annular slot 113 leading into the cavity 60 surrounding the shaft 21 and defined by the combustion chamber wall 66, and from there, escapes through the plurality of passages 58 through the rotor into the hollows of the first stage turbine impeller blades 52 for cooling, and finally the air passes out from the blades 52 through the boundary layer control slots 54 and into the combustion gases passing through the turbine expansion zone. Another portion of the air escapes from the cavity 60 through the annular passage 114 formed between the forward edge of the turbine rotor 28 and the lower discharge lip of the turbine inlet nozzle. This air passes into the expansion zone of the gas turbine in the form of a relatively thin boundary layer which flows along the surfaces of the gas turbine rotors 28 and 34, and finally comingles with the gases discharged from the gas turbine through the nozzle $N_1$. Cooling air also enters the hollows of blades 43 of the second stage of the gas turbine by way of the shaft bore 57 and the lateral passages 56 in the rotor 34. Air thus entering the blades 43 is discharged through the slots 55 in the manner before described in connection with the turbine impeller blades 52. Circulation of the air into the impeller blades 43 is induced in part by the ramming effect of the air meeting the entrance 61 of the bore 57 when the unit is in motion, and also by reason of the centrifugal force action upon the bodies of air in the lateral passages 56 and in the hollow blades 43, when they are rotating at high speed.

Having described only a typical form of the invention, I do not wish to be limited to the specific details herein set forth, but wish to reserve to myself any variations or modifications that may appear to those skilled in the art or fall within the scope of the following claims.

I claim:

1. In a gas reaction propulsive unit, a nozzle adapted to form a propulsive jet of gases comprising a plurality of overlapping bi-metallic leaves defining the nozzle passage and free throughout the major portions of their lengths for radial deflection in response to temperature variations, whereby to vary automatically the size of the nozzle to accommodate variations in the volume of gas flow and thereby prevent excessive back pressure on said unit.

2. In a gas reaction propulsive unit, a nozzle adapted to form a propulsive jet of gases comprising a truncated conical conduit formed by inner and outer annular series of bi-metallic leaves, the leaves of the outer series overlying the spaces between the leaves of the inner series and overlapping the edges of the latter leaves, whereby to provide a nozzle which automatically varies in size to accommodate variations in the volume of gas flow and thereby prevent excessive back pressure on said unit.

3. In a gas reaction propulsive unit, a nozzle adapted to form a propulsive jet of gases comprising a mounting ring, a truncated conical conduit formed by a plurality of slidably overlapping bi-metallic leaves having their forward ends fixed to the mounting ring, their rearward trailing ends free and their expansion sides facing inwardly and having substantial portions free for unrestrained radial expansion and contraction in response to temperature variations, whereby to vary automatically the size of the nozzle to accommodate variations in the volume of gas flow and thereby prevent excessive back pressure on said unit.

4. In an internal combustion reaction type power plant including a combustion chamber, means for injecting fuel into the combustion chamber and a turbine driven by gas flow from the combustion chamber and having a passage for exhausting the gas; the combination of means for introducing fuel into said passage, and a nozzle for spouting gas from said passage comprising an annular wall which is automatically expansible and contractible in response to variations in the temperature of the gas which diminishes in temperature as it flows rearwardly through the nozzle.

5. In an internal combustion reaction type power plant including a combustion chamber, means for injecting fuel into the combustion chamber, and a turbine driven by gas flow from the combustion chamber and having a passage for exhausting the gas; the combination of means for introducing fuel into said passage, and means for discharging the gas in the form of a propulsive jet comprising a thermally deformable bimetallic nozzle extending from said passage operable to expand and contract in response to variations in the temperature of said gas.

6. In an internal combustion reaction type power plant having a gas exhaust member defining a passage which converges in the direction of gas flow, and a nozzle for said member operable to define a convergent discharge opening for the spouting of the gas and expansible under the influence of increased gas temperature, the nozzle comprising inner and outer annular series of bimetallic leaves, the leaves of each series being spaced apart and the leaves of the outer series overlying the spaces between the leaves of the inner series and overlapping the edges of the latter leaves, whereby to provide a nozzle which automatically varies in size to accommodate variations in the volume of gas flow and thereby prevent excessive back pressure on the power plant.

7. In an internal combustion reaction type power plant having a gas exhaust member defining a passage which converges in the direction of gas flow, and a nozzle for said member comprising a tubular series of elongate, flexible, bi-metal leaves attached to said member to extend rearwardly therefrom and defining a discharge opening for the spouting of the gas, the leaves of the series being in overlapping relation to prevent the lateral escape of gas, said tubular series being expansible and contractible in response to variations in the temperature of the gas to vary automatically the cross sectional area of said discharge opening to accommodate variations in the volume of gas flow and thereby prevent excessive back pressure on said power plant.

8. A nozzle for a fluid conduit comprising a tubular nozzle assembly extending from the conduit and characterized by an annular series of overlapping bi-metal leaves defining the nozzle opening and free throughout the major portion of its length to be expansible and contractible in a radial direction to vary the area of said opening upon a change in temperature of the fluid.

9. An internal combustion reaction type power plant comprising turbo-compressor means, a duct for carrying the exhaust gas from said means, and a nozzle for spouting the gas from the duct in the form of a propulsive jet of accelerated velocity comprising an annular series of flexible bi-metal leaves having one end anchored to the duct and extending from the duct to define a nozzle opening, the leaves being flexible radially in response to temperature and gas pressure variations to vary the effective area of said opening and the adjacent leaves of the series being in overlapping relation to prevent the lateral escape of the gas.

10. In an internal combustion reaction type power plant having turbo-compressor means operable to discharge gas at varying temperatures and velocities, the combintion of a duct for discharging the gas, and variable area and variable configuration nozzle means for spouting the gas from the duct in the form of a propulsive jet, the nozzle means including a tubular series of bi-metal leaves anchored at one end to the duct to extend therefrom in converging relation during gas flow at relatively low temperatures and bendable outwardly under the influence of increased gas temperatures to define a nozzle opening of increased area and of convergent-divergent configuration, whereby to prevent excessive back pressure on the power plant under the latter conditions the leaves of the series being spaced apart circumferentially to have independent flexure, and parts carried by the duct and extending along the exterior of said series to close the spaces between the leaves.

11. In an internal combustion reaction type power plant having turbo-compressor means operable to discharge gas at varying temperatures and velocities, the combination of a duct for discharging the gas, and variable area and variable configuration nozzle means for spouting the gas from the duct in the form of a propulsive jet, the nozzle means including a tubular series of bi-metal leaves anchored at one end to the duct to extend therefrom in converging relation during gas flow at relatively low temperatures and bendable outwardly under the influence of increased gas temperatures to define a nozzle opening of increased area and of convergent-divergent configuration, whereby to prevent excessive back pressure on the power plant under the latter conditions the adjacent leaves of the series being spaced apart circumferentially for independent flexure, and an outer series of flexible leaves overlapping the first named leaves to close the spaces between the same.

12. In an internal combustion reaction type power plant having turbo-compressor means operable to discharge gas at varying temperatures and velocities, the combination of a duct for discharging gas, and variable area and variable configuration nozzle means for spouting the gas from the duct in the form of a propulsive jet, the nozzle means including a tubular series of bi-metal leaves anchored at one end to the duct to extend therefrom in converging relation during gas flow at relatively low temperatures and bendable outwardly under the influence of increased gas temperatures to define a nozzle opening of increased area and of convergent-divergent configuration, whereby to prevent excessive back pressure on the power plant under the latter conditions the adjacent leaves of the series being spaced apart circumferentially for independent flexure, and an outer series of flexible bi-metal leaves overlapping the first named leaves to close the spaces between the same.

13. An internal combustion reaction type power plant comprising turbo-compressor means, a duct for carrying the exhaust gas from said means, and a nozzle for spouting the gas from the duct in the form of a propulsive jet comprising inner and outer annular series of spaced flexible leaves each having one end secured to the duct, the leaves extending from the duct to define a nozzle opening and the leaves of the outer series overlapping the spaces between the leaves of the inner series, at least one series of leaves being bi-metal to cause expansion and contraction of said opening in response to temperature changes in the gas.

NATHAN C. PRICE.

REFERENCES CITED

The following references are of record in the file of this patent:

UNITED STATES PATENTS

| Number | Name | Date |
|---|---|---|
| 157,526 | Leggett | Dec. 8, 1874 |
| 930,095 | Seagrave | Aug. 3, 1909 |
| 1,473,668 | Byrnes | Nov. 13, 1923 |
| 1,725,914 | Hallowell | Aug. 27, 1929 |
| 1,766,608 | Crews | June 24, 1930 |
| 2,095,991 | Lysholm | Oct. 19, 1937 |
| 2,109,628 | Alban et al. | Mar. 1, 1938 |
| 2,158,270 | Browne | May 16, 1939 |
| 2,280,835 | Lysholm | Apr. 28, 1942 |
| 2,303,992 | Frazer et al. | Dec. 1, 1942 |
| 2,390,161 | Mercier | Dec. 4, 1945 |
| 2,397,998 | Goddard | Apr. 9, 1946 |
| 2,437,287 | Woods | Mar. 9, 1948 |

FOREIGN PATENTS

| Number | Country | Date |
|---|---|---|
| 126,325 | Great Britain | May 15, 1919 |
| 523,468 | Great Britain | July 15, 1940 |

OTHER REFERENCES

"Jet Propulsion of Aircraft," by G. G. Smith, in Flight for October 9, 1941, pages 239 and 242.